United States Patent [19]

Beysson

[11] Patent Number: 5,083,309
[45] Date of Patent: Jan. 21, 1992

[54] METHOD AND A SYSTEM ENABLING SOFTWARE TO BE RUN SECURELY

[75] Inventor: Daniel Beysson, Crespieres, France

[73] Assignee: Schlumberger Industries, Montrouge, France

[21] Appl. No.: 615,436

[22] Filed: Nov. 16, 1990

[30] Foreign Application Priority Data

Nov. 23, 1989 [FR] France ................ 89 15394

[51] Int. Cl.⁵ .................................. H04L 9/00
[52] U.S. Cl. .............................. 380/4; 380/23; 380/25
[58] Field of Search ................. 380/3, 4, 23, 25

[56] References Cited

U.S. PATENT DOCUMENTS

| | | | |
|---|---|---|---|
| 4,683,553 | 7/1987 | Mollier | 380/4 |
| 4,907,268 | 3/1990 | Bosen et al. | 380/4 |
| 4,932,054 | 6/1990 | Chou et al. | 380/4 |

FOREIGN PATENT DOCUMENTS

| | | |
|---|---|---|
| 0135422 | 3/1985 | European Pat. Off. . |
| 0314148 | 5/1989 | European Pat. Off. . |
| 2606185 | 5/1988 | France . |
| WO8805941 | 8/1988 | World Int. Prop. O. . |

*Primary Examiner*—Thomas H. Tarcza
*Assistant Examiner*—David Cain
*Attorney, Agent, or Firm*—Lewis H. Eslinger; Jay H. Maioli; Donald S. Dowden

[57] ABSTRACT

When a user receives a data medium containing software, the user is also provided with a memory card that must remain engaged in a card reader associated with the computer on which the software is run while the software is being run. Various intermediate results are stored in the memory of the card and not in the memory of the computer. During subsequent execution of the software these intermediate results are read back from the memory in the card.

14 Claims, 3 Drawing Sheets

METHOD AND A SYSTEM ENABLING SOFTWARE TO BE RUN SECURELY

The present invention relates to a method and to a system enabling software to be run securely.

More precisely, the present invention relates to enabling software to be run securely by a user who has acquired the right to use the software from an owner thereof.

BACKGROUND OF THE INVENTION

Protecting software against illegal copying by users is very difficult, and such protection is of genuine economic interest.

Proposals have been made to protect certain high-value software packages against illegal copying by associating the software with an external memory, e.g. of the ROM type, which memory must be plugged into an input/output port of the microcomputer on which the software is run. If the external memory is not connected to the microcomputer, then it is not possible to use the corresponding software. Such a portection system suffers from being passive. A fraudulent user merely has to analyze the signals interchanged between the external memory and the microcomputer in order to be subsequently capable of simulating an external memory, thereby defeating the protection.

In order to avoid this drawback, proposals have also been made to associate a main data medium on which the software to be protected is recorded with a removable data medium which is loaded into a device which is auxiliary to the main apparatus on which the software is run. A portion of the software is stored on the removable medium. The main portion of the software stored on the main hard disk of the microcomputer is insufficient for enabling the software as a whole to run. The removable medium is preferably of the electronic memory type card with access to the card memory being controlled. This solution improves software protection against copying, but it suffers from the drawback of requiring numerous interchanges between the main apparatus on which the software is being run and the auxiliary device in which the memory card is inserted, thereby significantly reducing the speed of executing of the software.

An object of the invention is to provide a method of running software which is protected against illegal copying, the method providing the same degree of protection as the system described above, but reducing transit times between the main apparatus on which the software is run and the auxiliary device.

SUMMARY OF THE INVENTION

To achieve this object, the present invention provides a method of running software by means of a system comprising at least a main apparatus on which said software is run and an auxiliary device for receiving a removable data medium including at least a memory zone and suitable for interchaning information between said main apparatus and said memory zone, the method comprising the steps of:

defining in said software a certain number of commands requesting communication with said auxiliary device, said commands comprising first commands associated with the generation of intermediate results for said software, and second commands associated with requesting intermediate results in order to enable the program execution to continue;

on the appearance of each first command, writing one of said intermediate results in said memory zone; and on the appearance of each second command, reading one of said intermediate results from said memory zone, thereby ensuring that the software cannot be executed in full unless said suitable removable medium is present in said auxiliary device.

It will thus be understood that the software cannot be run if the removable data medium is not present in the auxiliary device. However, the quantity of information transiting between the auxiliary device and the main apparatus is reduced, thereby not significantly increasing running time. In addition, the removable data medium initially contains no information specific to the software with which it is associated. As a result, initial programming of this medium is simplified.

Another object of the invention is to provide a method of enabling software to be run securely which also makes it possible for the software to be hired out, with the user paying rental only as a function of the time said software is actually run.

Another object of the invention is to provide a system for implementing the above-specified method.

BRIEF DESCRIPTION OF THE DRAWINGS

An embodiment of the invention is described by way of example with reference to the accompanying drawings, in which.

DETAILED DESCRIPTION

Before describing a preferred implementation of the invention in detail, the description begins by explaining the principle on which the invention is based.

The software which is intially loaded into the main apparatus includes all of the instructions required for it to be executable. However, at certain stages, this software includes instructions which cause certain intermediate results to be loaded into an auxiliary data medium, and preferably an electronic memory card. These intermediate results are not stored in the main apparatus. When the software subsequently needs to make use of such an intermediate result, it includes an instruction to read intermediate results from the auxiliary data medium, after which the software can execute normally on the main apparatus. In order to prevent a user making fraudulent use of a legal system including the software and a card by analyzing and storing the signals transmitted both ways between the main apparatus to the auxiliary device, and then simulating the presence of a card on the basis of such activity, two main precautions are taken.

The first precaution consists in encoding the information passing either way between the main apparatus and the auxiliary device by means of secret keys drawn at random. Each time the main apparatus makes a request to read from the card, the corresponding instruction transmitted by the main apparatus is encoded using the current key. The reply from the auxiliary device is encoded using randomly-generated new key, and in addition the auxiliary device transmits the new key encoded using the old key. The new key then becomes the current key. When the main apparatus seeks to change data contained in the card, the corresponding instructions are encoded by the current key and the current key is not changed.

The second precaution consists in ensuring that the time required for the execution of the various portions of the software does not become too long. Experience shows that when attempts are made to defraud a program by analyzing and memorizing its operation, there is a delay or an increase in the time required for execution of the corresponding portion of the software. To implement this second precaution, each time a request is made for a connection between the main apparatus and the auxiliary device, duration information is transmitted to the auxiliary device, i.e. to the card. This duration information corresponds to a time greater than that which would normally elapse during execution of the software between the current request and the following request for a connection between the main apparatus and the auxiliary device. This duration information is stored in the card and it is compared with the time that actually elapses between two successive connection requests. If the real time is greater than the time specific by the duration information, then access to the card is inhibited, thus making execution of the software impossible.

Figure 1:
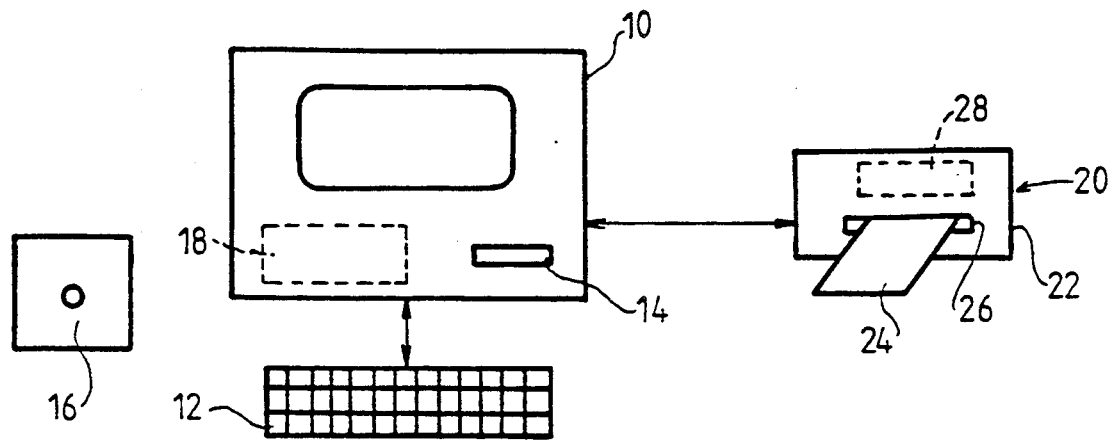
FIG. 1 is an overall view of a system for running software.

A system enabling software to be run securely is initially described as a whole with reference to FIG. 1. The system comprises a conventional main apparatus 10 for running software. In the figure there can be seen a data entry keyboard 12, a slot 14 of a drive for receiving a magnetic data medium 16, and the main hard disk memory 18 of the main apparatus. The main apparatus 10 is associated with an auxiliary device 20 constituted by an electronic memory card reader 22. The reader 22 essentially comprises a system for guiding a memory card 24 (represented merely by a card-insertion slot 26), a connector (not shown), and a processor circuit 28. The purpose of the processor circuit 28 is merely to receive information transmitted by the main apparatus 10 or to send information thereto as read from the card, and to control read and write operations in the integrated circuit of the card 24.

Figure 2:
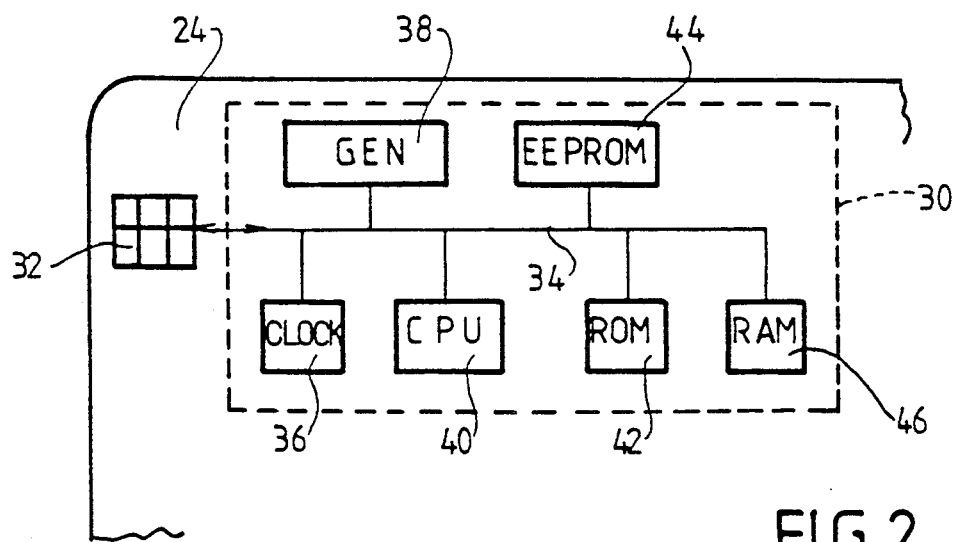
FIG. 2 is a block diagram of the circuit in the memory card which constitutes the removable data medium.

Reference is now made to FIG. 2 while describing one particular embodiment of the circuit 30 in the card 24. The card 24 has external contacts 32 which are connected to the bus 34 of the circuit 30. The bus 34 has the following components connected thereto: a clock circuit 36 delivering time pulses; a pseudo-random number generator 38; a central processor unit 40 (CPU); a read-only memory (ROM) type program memory 42; an erasable programmable ROM (EPROM) or an electrically erasable programmable ROM (EEPROM) type memory 44 for storing successive credit balances; and a volatile memory 46 which serves both as a working memory for the CPU 40 and as a memory for non-permanent storage of intermediate results coming from the main apparatus 10. In other words, the card 24 is a microprocessor type card.

The card 24 may be have ISO type external contacts, or it may have multiple contacts aligned along one of its edges.

The read only memory 42 contains various programs which are implemented by the CPU 40. There is an overall card control program GES together with specific subprograms. These subprograms comprise: a subprogram COD for encoding information transmitted to the main apparatus 10 on the basis of a key which is either delivered by the random number generator 38 or else is temporarily stored in the memory 46; a subprogram DECOD which serves to decode information received from the main apparatus 10 on the basis of the key stored temporarily in the memory 46; a subprogram COMP which serves to compare duration information $t_n$ stored in the memory 46 with elapsed time information $T_n$ generated on the basis of initialization and of pulses delivered by the clock 36; a subprogram SOLDES which serves firstly to decrement information relating to the available credit balance stored in the memory 44 as a function of elapsed time information $T_n$ and secondly to deliver an alarm signal AL when the credit in the memory 44 becomes zero; a subprogram INTERRUPT which serves to interrupt incrementation of the elapsed time information $T_n$ on receiving a special signal AR and to cause such incrementation to start again on receiving a signal REP; and a subprogram INHIBIT for preventing access to the card circuit as a function of results obtained by running the subprogram COMP. In other words, the subprogram INHIBIT is activated to prevent access to the circuit in the card 24 whenever the subprogram COMP detects that the elapsed time $T_n$ has exceeded the corresponding duration $t_n$.

Another portion of the invention is now described with reference to FIG. 3 which shows a portion of the software L to be run. This figure is a flow chart showing a portion of the software L stored on the medium 16, which medium is given to the user at the same time as the security card 24. Naturally, the software L is loaded into the central memory 18 of the main apparatus 10.

Figure 3:
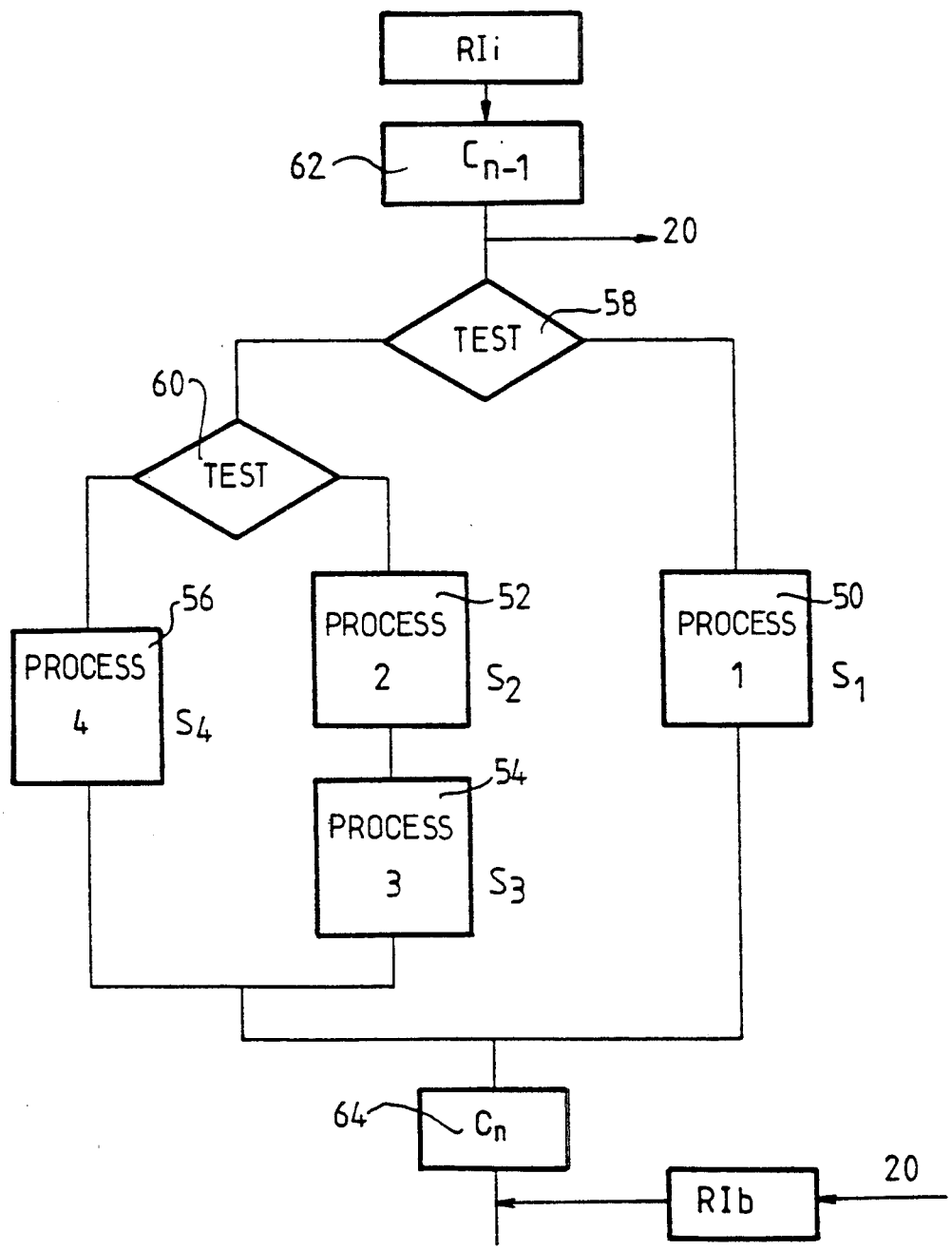
FIG. 3 is a flow chart of a portion of the software run on the system.

As shown in FIG. 3, the software L includes instructions that would be there even if the software were not protected in accordance with the invention, together with a limited number of instructions which are specific to the method of the invention for making software secure. There are processing stages 50, 52, 54, and 56, and test stages 58, and 60 which correspond to "normal" software L, i.e. without protection. There are also instructions for establishing communication with the auxiliary device 20, i.e. with the circuit 30 in the card 24. The set of instructions 62 corresponding to a command $C_{n-1}$ serves to transfer an intermediate result $RI_i$ to the auxiliary device 20, and more particularly to the memory 46 of the circuit in the card. The intermediate result $RI_i$ is generated by executing portions of the software L preceding the portion which is shown in FIG. 3. By performing the command $C_{n-1}$, the intermediate result $RI_i$ is stored in the card and is no longer stored in the main apparatus 10.

Similarly, the set of instructions 64 corresponds to the command $C_n$ and is specific to protecting the software L in accordance with the invention. At this stage in the execution of the software L the software requires an intermediate result $RI_b$ that was generated earlier while running the software. As explained above, the intermediate result $RI_b$ is not stored in the main apparatus 10, and is only stored in the memory 46 of the circuit in the card 24. The command $C_n$ establishes a connection with the auxiliary device 20 to cause the intermediate result $RI_b$ to be transferred to the main apparatus 10, thereby enabling the software L to continue running. It will immediately be understood that if the card 24 is not present in the auxiliary device 20, then the software L cannot be used.

The software L of the invention includes another type of special information associated with the commands $C_n$.

Each stage in the execution of the software, e.g. 52 to 56 in FIG. 3, may be associated with a "normal" execution time s1, s2, s3, s4. Thus between control stages 62 and 64, it is possible to define a total maximum execution time for this portion of the software, taking account of test stages 58 and 60. In the particular case of FIG. 3, this maximum execution time $t_{n-1}$ is given by the expression:

$$t_{n-1} = \max[s1, s2+s3, s4]$$

At the same time as the command $C_{n-1}$ causes intermediate result $RI_i$ to be transferred into the memory of the card 24, it also cause duration information $t_{n-1}$ to be transferred. Similarly, the command $C_n$ causes not only the intermediate result $RI_b$ to be transferred from the card 24 to the main apparatus 10, but also causes duration information $t_n$ to be transferred, which information corresponds to the "normal" execution time of the software L between command $C_n$ and the following command $C_{n-1}$ (not shown in FIG. 3).

In order to increase the protection of the software further, the information passing from the main apparatus 10 to the auxiliary device 20 and from the auxiliary device 20 to the main apparatus 10 is encoded as mentioned briefly above. The encoding is performed by means of keys $f_n$ which are generated by the random number generator 38 of the circuit 30 in the card 24. Since the encoding key is changed by means of a process described below, two successive identical runs of the software L will cause different information to be transmitted between the main apparatus 10 and the auxiliary device since the keys will be different. It will thus be understood that the sets of instructions 62 and 64 include implementing an encoding algorithm (62) or a decoding algorithm (64) using a key that has been transmitted from the card to the main apparatus at an earlier stage. This process is described in detail below. However, at this point in the description, the following general points can be given: each time a command instruction $C_n$ consists in requesting the card to read an intermediate result $RI_j$ already stored therein, the card responds by transmitting to the main apparatus 10 both the intermediate result $RI_j$ encoded using a new key $f_n$ generated by the random number generator 385, and the new key $f_n$ itself encoded using the preceding key $f_{n-1}$. On receiving these two items of information, the main apparatus begins by decoding the new key $f_n$ using the preceding key $f_{n-1}$ already contained in its memory, and then uses the new key $f_n$ to decode the intermediate result $RI_j$. When a command $C_n$ consists in the main apparatus transmitting a new intermediate result $RI_j$ to the card 24 for storage therein, then the intermediate result is encoded using the current value of the key $f_n$ and it is decoded by the card using the same key.

It should be added that the program resident in the main apparatus includes a subprogram INTERRUPT concerned with managing duration information $t_n$. During execution of some portions of the software L, the user is required to key external instructions or data into the main apparatus using the keyboard 12 associated therewith. It will be understood that the time required for this external information to be keyed in depends on the particular application for which the software L is being used and also, to some extent, on the keyboard skills of the user. The duration information $t_n$ concerning normal execution of a portion of the software including a stage during which external data is entered is therefore practically impossible to determine in advance. In order to solve this problem, each time the software L requests input from the keyboard 12 or any other operation whose duration cannot be determined in advance, the subprogram INTERRUPT transmits a signal AR to the card 24 to prevent clock pulses delivered by the clock circuit 36 being counted. After external data has been entered, the subprogram INTERRUPT transmits a signal REP to the card 24 causing it to continue counting clock pulses. Thus, the time taken to enter data is not taken into account when determining the effective elapsed time $T_n$ between two consecutive command signals. The resident program also includes means for storing the key $f_n$ received from the auxiliary device and for deleting the previously received key $f_{n-1}$.

Figure 4:
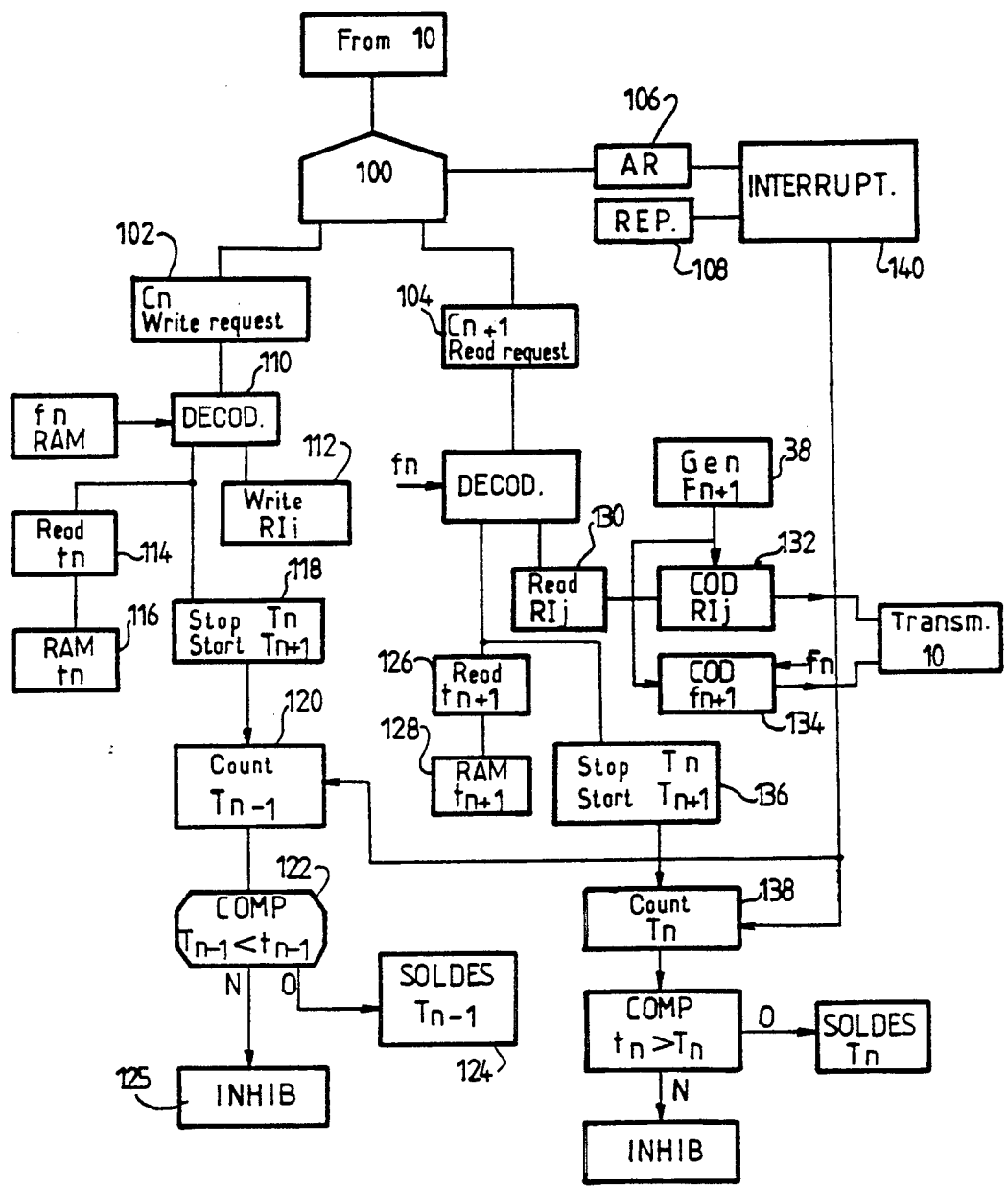
FIG. 4 is a flow chart of software run by the circuit in the card.

The operation of the system of the invention is now described with reference more particularly to FIG. 4. FIG. 4 is a flow chart of the program GES stored in the memory 42 of the card and which is run on the CPU 40 of the card circuit.

On receiving a signal from the main apparatus 10 via the reader 20, the program GES runs a test 100 to determine the nature of the signal it has received. This can either be a command $C_n$ requesting a card write (102), or a command $C_{n+1}$ requesting a card read (104); or a signal AR (106); or else a signal REP (108). The description begins with the operation of the program GES in the event that the received information is a write request (102). The program GES calls subprogram DECOD (110) to decode the information by means of the current key $f_n$ which is stored in the memory 46. The intermediate results decoded in this way $RI_i$ is written in the memory 46 (112). The message received also contains duration information $t_n$ (114) which is stored in the memory 46 (116). Reception of the command $C_n$ also stops (118) the counting (120) of pulses delivered by the clock circuit 36 for generating information $T_{n-1}$ relating to time that has actually elapsed, and initializes (118) a new count of clock pulses for generating a new information $T_n$ relating to elapsed time. The program GES then calls subprogram COMP (122) to compare the effective elapsed time $T_{n-1}$ with previously received duration information $t_{n-1}$. If $T_{n-1} < t_{n-1}$, i.e. if the software L has executed normally, then the program GES calls the subprogram SOLDES (124) which decrements the previous credit balance in the balance memory 44 by an amount which corresponds to the effective utilization time $T_{n-1}$. In addition, the information $t_{n-1}$ is deleted from the memory 46. Otherwise, (i.e. $T_{n-1} > t_{n-1}$), it is assumed that fraud has been attempted and the program GES calls subprogram INHIB (125) which prevents the circuit in the card 24 being accessed from the main apparatus 10. The software L can no longer be used.

Operation of the program GES is now described in the event that the test 100 detects that it has received a read request command $C_{n-1}$ (104). The program GES calls subprogram DECOD to decode the information received using the current $f_n$ key stored in the memory 46. This provides new duration information $t_{n+1}$ (126) which is stored in the memory 46 (128). Thereafter, intermediate information $RI_j$ is read from the memory 46 at the appropriate address (130). The program GES then calls subprogram COD. The intermediate result $RI_j$ is encoded by the subprogram COD using a new key $f_{n+1}$ delivered by the random number generator 38. Likewise, the new key $f_{n+1}$ is encoded using the stored preceding key $f_n$ (134). The old key $f_n$ is erased from the memory 46 and is replaced by the key $f_{n+1}$. As for a write request command, the program GES also controls execution time checking operations. On receiving information from the main apparatus, effective elapsed time $T_n$ counting is stopped (136) and a new clock pulse counting stage (138) is started for determining a new effective elapsed time $T_{n+1}$. The program GES then calls the subprogram COMP to compare the effective elapsed time $T_n$ with the previously received corresponding duration information $t_n$.

If $T_n < t_n$, then the software L has been executed correctly and the program GES calls subprogram SOLDES to decrement the available credit balance in the memory 44 of the card by an amount corresponding to the effective utilization time $T_n$. If $T_n > t_n$, then it is assumed that fraud has been attempted and the program GES calls subprogram INHIB to prevent access to the circuit in the card 24.

Test stage 100 may also detect that the received information is the signal AR (106) or the signal REP (108). In this case, the program GES calls subprogram INTERRUPT. If the received information is AR, then subprogram INTERRUPT (150) stops the counting of clock pulses for generating the effective elapsed time information $T_{n-1}$ or $T_n$ (120, 138). If the received signal is the signal REP, then the subprogram INTERRUPT causes clock pulses to be counted again.

In the above description, the circuits of the card 24 generate a new key only if the card receives a request to read an intermediate result that has already been stored. In a variant implementation of the invention, the card may also issue a new key in response to a card write request. The new key is transmitted in association with an acknowledge signal.

In the embodiments described above, the memory card includes no information which is specific to the particular software with which it is associated, and this naturally simplifies initial programming of the card. Nevertheless, it is possible to provide for the card to contain unchanging information specific to the software with which it is associated, e.g. in its memory 44. In this case, each time the card is called, a check is made that the specific information corresponds with the software currently being run by the main apparatus 10.

Finally, it should be emphasized that the invention makes it possible to bill software as a function of effective utilization time, i.e. to "rent" software. When a user receives a copy of the software with the associated card, the memory 44 in the card includes an initial pecuniary balance corresponding to a time credit for using the software. As the software is used, so the balance is decremented. When the balance becomes zero, the user must pay a new sum of money in order to reload the card with a new initial credit corresponding to a further period of software "rental".

I claim:

1. A method of running software by means of a system comprising at least a main apparatus on which said software is run and an auxiliary device for receiving a removable data medium including at least a memory zone and suitable for interchanging information between said main apparatus and said memory zone, the method comprising the steps of:

defining in said software a certain number of commands requesting communication with said auxiliary device, said commands comprising first commands ($C_n$) associated with the generation of intermediate results for said software, and second commands ($C_n$) associated with requesting intermediate results in order to enable the program execution to continue;

on the appearance of each first command ($C_n$), writing one of said intermediate results in said memory zone; and on the appearance of each second command ($C_n$) reading one of said intermediate results from said memory zone, thereby ensuring that the software cannot be executed in full unless said suitable removable medium is present in said auxiliary device.

2. A method according to claim 1, in which at least some of the commands ($C_n$) in said software are associated with duration information ($t_n$) which is not less than the normal execution time of said software between said command ($C_n$) and the following command ($C_{n+1}$); said duration information ($t_n$) being transmitted to said auxiliary device, and being compared in said auxiliary device with the time that effectively elapses between receiving two successive commands; with access to said auxiliary device being inhibited or not inhibited as a function of the result of said comparison.

3. A method according to claim 1, in which, on receiving each second command ($C_n$), said auxiliary device transmits a reply which is encoded on the basis of a new secret key ($f_{n+1}$) together with the new secret key ($f_{n+1}$) encoded using the preceding key ($f_n$).

4. A method according to claim 2 of running software rented by an owner to a user, wherein a pecuniary balance second zone is additionally defined in the memory zone of said removable medium; an initial pecuniary balance is written into said second zone when the software is supplied; and said balance is decremented during utilization of said software as a function of the information relating to time effectively elapsed ($f_n$) as generated by said auxiliary device.

5. A method according to claim 4, in which said main apparatus is suitable for transmitting interrupt information to said auxiliary device during certain stages of the execution of said software, and on receiving interrupt information, said auxiliary device interrupts its measurement of the time effectively elapsed since the preceding command ($C_n$), thus interrupting decrementation of the pecuniary balance.

6. A method according to claim 3, in which, on receiving each first command ($C_n$), said auxiliary device transmits an acknowledgment signal which is encoded using a new secret key ($f_{n+1}$) together with the new secret key ($f_{n+1}$) which is encoded using the preceding key ($f_n$).

7. A method according to claim 2, in which, on receiving each second command ($C_n$), said auxiliary device transmits a reply which is encoded on the basis of a new secret key ($f_{n+1}$) together with the new secret key ($f_{n+1}$) which is encoded using the preceding key ($f_n$).

8. A system for running software provided by an owner to a user, the system comprising:

a first medium in which said software is stored;

a removable second medium including a memory zone suitable for receiving information;

a main apparatus for loading said software from the first medium, and for running it;

an auxiliary device suitable for receiving said second medium, said auxiliary device being connected to said main apparatus to enable information to be interchanged between said main apparatus and said auxiliary device;

said software stored in said first medium including a set of instructions for execution together with first commands ($C_n$) for causing intemediate results to be transmitted to said auxiliary device and second commands ($C_n$) for requesting said auxiliary device to provide preceding intermediate results to the main apparatus; and said auxiliary device including means for storing said intermediate results transmitted by said main apparatus in the memory zone of said second removable medium, and means for transmitting intermediate results to said main apparatus on receiving a second command ($C_n$).

9. A system according to claim 8, in which said second removable medium is an electronic circuit memory card including memory means and processor means.

10. A system according to claim 9, in which said software associates at least some of said commands ($C_n$) with duration information ($t_n$) which is not less than the normal execution time of said software between said command ($C_n$) and the following command ($C_{n+1}$); and main apparatus including means for transmitting said duration information ($t_n$) to said auxiliary device; and said processor means of the card including means for counting the effective time ($T_n$) that elapses between said command ($C_n$) and receiving the following command ($C_{n+1}$), and means for comparing the duration information ($t_n$) and said effective time ($T_n$).

11. A system according to claim 9, in which said processor means include means for generating secret keys ($f_n$) and means responsive to receiving a command ($C_n$) for generating an encoded response using said key ($f_n$) and for encoding said key ($f_n$) using the proceding key ($f_{n-1}$).

12. A system according to claim 10, in which said card includes memory means for storing initial pecuniary balance information when said card is issued with said first medium containing said software; and said card processor means includes means for decrementing said initial balance as a function of the effective elapsed time information ($T_n$).

13. A system according to claim 9, in which said auxiliary device is a memory card reader suitable for transmitting data read instructions and data write instructions to the circuit of said card.

14. A system according to claim 10, in which said processor means include means for generating secret keys ($f_n$) and means responsive to receiving a command ($C_n$) for generating an encoded response using said key ($f_n$) and for encoding said key ($f_n$) using the proceding key ($f_{n-1}$).

* * * * *